United States Patent
Hall, Jr. et al.

(10) Patent No.: US 6,275,610 B1
(45) Date of Patent: *Aug. 14, 2001

(54) FILE STRUCTURE FOR SCANNED DOCUMENTS

(75) Inventors: Floyd Steven Hall, Jr.; Cameron Telfer Howie, both of Menlo Park, CA (US)

(73) Assignee: Convey Corporation

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/946,680

(22) Filed: Oct. 8, 1997

Related U.S. Application Data

(60) Provisional application No. 60/028,649, filed on Oct. 16, 1996, provisional application No. 60/028,578, filed on Oct. 16, 1996, and provisional application No. 60/028,575, filed on Oct. 16, 1996.

(51) Int. Cl.⁷ ..................................................... G06K 9/34
(52) U.S. Cl. ......................... 382/180; 382/176; 382/305
(58) Field of Search .................................. 382/176, 180, 382/243, 173, 177, 305, 229, 218, 235, 224, 190, 195, 181–189; 395/114; 358/1.15, 462, 467; 707/1–6, 104; 706/12

(56) References Cited

U.S. PATENT DOCUMENTS

| | | | |
|---|---|---|---|
| 4,326,190 | * 4/1982 | Borland et al. | 382/197 |
| 4,718,105 | 1/1988 | Lipkie et al. | 382/243 |
| 4,813,078 | * 3/1989 | Fujiwara et al. | 382/185 |
| 4,864,628 | * 9/1989 | Scott | 382/197 |
| 5,216,726 | 6/1993 | Heaton | 382/243 |
| 5,303,313 | 4/1994 | Mark et al. | 382/235 |
| 5,384,863 | 1/1995 | Huttenlocher et al. | 382/173 |
| 5,410,611 | 4/1995 | Huttenlocher et al. | 382/177 |
| 5,455,871 | 10/1995 | Bloomburg et al. | 382/173 |
| 5,539,841 | 7/1996 | Huttenlocher et al. | 382/218 |
| 5,557,689 | 9/1996 | Huttenlocher et al. | 382/177 |
| 5,642,435 | 6/1997 | Loris | 382/229 |
| 5,689,620 | 11/1997 | Kopec et al. | 706/20 |
| 5,884,014 | * 3/1999 | Huttenlocher et al. | 358/1.15 |
| 5,999,664 | * 12/1999 | Mahoney et al. | 382/305 |

FOREIGN PATENT DOCUMENTS 0 809 192 A2   11/1997   (EP) ............................. G06F/17/00

OTHER PUBLICATIONS

Friedman, William F. et al., "Military Cryptanalytics Part I—vol. 1", Aegean Park Press, Dec. 1985, pp. 119–121.

* cited by examiner

*Primary Examiner*—Leo Boudreau
*Assistant Examiner*—Ishrat Sherali
(74) *Attorney, Agent, or Firm*—Haynes & Beffel LLP; Mark A. Haynes

(57) ABSTRACT

The present invention provides an electronic file and file structure solution for comprehensive management of documents captured as scanned objects, raster objects or representation. Using the present invention a representation of a document is created using any type of imaging device. The representation includes objects present in the document. The location in the document of the objects in the plurality of objects is identified. One copy of each different object in the plurality of objects is stored in the file. The location of objects in the plurality of objects are stored in the file in a spatial layout index. The file thus contains all of the information required to faithfully reproduce the original document. In order to reconstruct the document, the objects are placed at the locations identified by the spatial layout index.

12 Claims, 8 Drawing Sheets

FIGURE 7

100 COMMON ENGLISH WORDS

| # | Word | # | Word | # | Word |
|---|------|---|------|---|------|
| 1. | THE | 26. | OR | 51. | WHEN | 
| 2. | OF | 27. | HER | 52. | WHAT |
| 3. | AND | 28. | HAD | 53. | YOUR |
| 4. | TO | 29. | AT | 54. | MORE |
| 5. | A | 30. | FROM | 55. | WOULD |
| 6. | IN | 31. | THIS | 56. | THEM |
| 7. | THAT | 32. | MY | 57. | SOME |
| 8. | IS | 33. | THEY | 58. | THAN |
| 9. | I | 34. | ALL | 59. | MAY |
| 10. | IT | 35. | THEIR | 60. | UPON |
| 11. | FOR | 36. | AN | 61. | ITS |
| 12. | AS | 37. | SHE | 62. | OUT |
| 13. | WITH | 38. | HAS | 63. | INTO |
| 14. | WAS | 39. | WERE | 64. | OUR |
| 15. | HIS | 40. | ME | 65. | THESE |
| 16. | HE | 41. | BEEN | 66. | MAN |
| 17. | BE | 42. | HIM | 67. | UP |
| 18. | NOT | 43. | ONE | 68. | DO |
| 19. | BY | 44. | SO | 69. | LIKE |
| 20. | BUT | 45. | IF | 70. | SHALL |
| 21. | HAVE | 46. | WILL | 71. | GREAT |
| 22. | YOU | 47. | THERE | 72. | NOW |
| 23. | WHICH | 48. | WHO | 73. | SUCH |
| 24. | ARE | 49. | NO | 74. | SHOULD |
| 25. | ON | 50. | WE | 75. | OTHER |
| | | | | 76. | ONLY |
| | | | | 77. | ANY |
| | | | | 78. | THEN |
| | | | | 79. | ABOUT |
| | | | | 80. | THOSE |
| | | | | 81. | CAN |
| | | | | 82. | MADE |
| | | | | 83. | WELL |
| | | | | 84. | OLD |
| | | | | 85. | MUST |
| | | | | 86. | US |
| | | | | 87. | SAID |
| | | | | 88. | TIME |
| | | | | 89. | EVEN |
| | | | | 90. | NEW |
| | | | | 91. | COULD |
| | | | | 92. | VERY |
| | | | | 93. | MUCH |
| | | | | 94. | OWN |
| | | | | 95. | MOST |
| | | | | 96. | MIGHT |
| | | | | 97. | FIRST |
| | | | | 98. | AFTER |
| | | | | 99. | YET |
| | | | | 100. | TWO |

FIGURE 8

SOME UNCOMMON ENGLISH WORDS

TRANSACTION .................................... QUALITY
INVESTOR ........................................ CUSTOMER
INQUIRY ......................................... SERVICE

FILE STRUCTURE FOR SCANNED DOCUMENTS

RELATED APPLICATION

This application claims priority to the provisional U.S. patent application entitled "Isomorphic Pattern Recognition," by inventor Floyd S. Hall, having Ser. No. 60/028,649, and having filing date Oct. 16, 1996. This application also claims priority to the provisional U.S. patent application entitled "OCR Metafile Format," by inventor Floyd S. Hall, having Ser. No. 60/028,578, and having filing date Oct. 16, 1996. This application also claims priority to the provisional U.S. patent application entitled "Using Pattern Tags to Provide Full-Text Searching of Raster Words that are difficult to Recognize," by inventor Floyd S. Hall, having Ser. No. 60/028,575, and having filing date Oct. 16, 1996. Each of the aforementioned three provisional applications is hereby incorporated by reference.

FIELD OF THE INVENTION

The present invention relates to systems and methods for information storage, retrieval, and transmission, and more specifically to systems and methods for storing, retrieving, and transmitting documents.

DESCRIPTION OF RELATED ART

A document scanned into a computer system can be represented by a raster image of the document. This image can be used to reproduce the document to a degree limited by the fidelity of the scanning and storage system. However, without performing character recognition on the image, the document cannot be searched or edited as a text document, limiting the overall practical utility of scanned images of documents.

Ordinarily, to overcome these shortcomings, a scanned document will be input into a character recognition program. The document can then be treated as a text document. Typical character recognition programs, however, have significant shortcomings, including misrecognition of text (i.e. misidentifying a "b" as an "h"), misidentifying fonts, and potentially, the loss of significant formatting information. Often these shortcomings of traditional character recognition programs can only be overcome through time consuming and potentially expensive detailed proofreading of the document by a human operator.

Furthermore, when a document is stored in a computer file, whether mechanically entered into a computer or scanned in and proofread, a typical computer file may store each and every occurrence of a word, phrase, picture or formatting instruction. As a result the exact same information may be repeated numerous times within the file. This redundancy means that more information is stored in the file than is required to represent the information content of the document. Files stored in this manner take more computer memory to store, more bandwidth to transmit, and more time to process. For example, such a document may require more time to search through due to the redundancy of the information stored in the file.

One system that is sometimes used to enable a document to be quickly searched involves textual indexing schemes which store exactly one copy of each word contained within an electronic document. Although this technique makes it easier to search a document for text or text patterns, textual indexing schemes are not able to recreate the original document since formatting and other information is lost.

What is needed is a file format which can overcome shortcomings listed above, including storing the information content present in a document while reducing the redundancy inherent in the document.

SUMMARY OF THE INVENTION

The present invention provides an electronic file and file structure solution for comprehensive management of traditional word processor documents and documents captured as scanned images, raster images or a representation. In an embodiment of the present invention a representation of a document is received. The representation of the document includes a plurality of objects. The locations in the document of objects in the plurality of objects are identified. A plurality of sets of objects in the plurality of objects is generated wherein objects in the plurality of objects in each set in the plurality of sets are classified as similar. A file is created containing the locations of objects in the plurality of objects and one copy of an object from each set in a group of sets in the plurality of sets.

According to one aspect of the present invention objects in the plurality of objects include characters. According to another aspect of the present invention the file contains at most one object from each set in the plurality of sets. According to still another aspect of the present invention, the group of sets includes all of the sets in the plurality of sets. According to yet another aspect of the present invention, any suitable imaging device can be used to generate the representation of the document, including but not limited to a scanner, a fax machine, a photocopier, a digital photocopier, or a hand-held screen input computer.

In another embodiment of the invention a resource receives a representation of a document. The representation includes a plurality of objects. Objects in the plurality of objects are classified as similar. A resource identifies locations in the document of objects in the plurality of objects. A resource creates a file. The file contains one copy of each object in the plurality of objects classified as different and the locations of the objects in the document.

In yet another embodiment of the present invention a resource receives a representation of a document. The representation includes a plurality of objects. A resource identifies locations in the document of objects in the plurality of objects. A resource generates a plurality of sets of objects in the plurality of objects wherein objects in the plurality of objects in each set in the plurality of sets are classified as similar. A resource creates a file containing the locations of objects in the plurality of objects and containing one copy of an object from each set in a group of sets in the plurality of sets. In one aspect of the invention objects in the plurality of objects include characters. In another aspect of the invention the file contains at most one object from each set in the plurality of sets. In yet another aspect of the present invention the group of sets includes all of the sets in the plurality of sets.

The file thus may contain all of the information required to faithfully reproduce the original document. In order to reconstruct the document, the objects are placed at the locations identified in the file. The file stores the location of the objects in any format which retains enough information content to allow the original document to be reproduced to the extent desired by the user. For example, location information can be stored as absolute coordinates of the objects in the document, or as relative coordinates of the objects with respect to each other. Additionally, the location information can be stored as a distance from a fixed point in the document such as the upper left-hand corner, or the location information could be stored as the distance of the objects from a calculated point or a user defined point such as the center of a page, or the centroid of the objects on the page. In one aspect of the invention, the location information is stored in a spatial location index in the file.

According to another aspect of the present invention the representation is a representation format of a type generated by a scanner, an imager, a fax machine, a photocopier, a digital photocopier, or a hand-held screen input computer. In one aspect of the invention, the representation includes only bit mapped images or image primitives, but not traditional word processor application formatting codes or text codes.

According to yet another aspect of the invention, objects can be classified into sets of similar objects depending on user preferences and specific applications. For example, a user may desire to classify an "e" in Helvetica font being the same as a "e" in Times font, but a user may want a five pointed star with rounded corners to be classified as different from a five pointed star with pointed corners, and it is noted that some sets may contain only one object. In this aspect of the invention, the file will store only one copy of an object from each set of objects which the user wishes to classify as similar, and the file will store the location or locations of each object within the original document.

According to this aspect of the invention, only those distinctions which are important to the user are noted. This saves storage space, reduces processor time, and allows the file to be more quickly transmitted over a network. According to one aspect of the present invention, similar objects can be identified and classified in the representation as follows. When a new object is identified in the representation, the identified object is used as a template to search the representation for similar objects. The template will be considered to be matched by objects in the representation which are within the similarity tolerances specified by the user.

In another embodiment of the present invention, the representation is input into a character recognition system. Objects in the plurality of objects are identified as characters. The characters and the images of the characters (e.g., bit maps) are then stored in the file while the location of the characters and the images in the document are stored in a spatial layout index in the file. In one aspect of the present invention, only one copy of each different character is stored in the file.

In another aspect of the present invention, the representation is input into a character recognition system and objects in the plurality of objects are identified as words. The words and the images of the words (e.g., bit maps) are then stored in the file while the location of the words and the images in the document are stored in a spatial layout index in the file. In one aspect of the present invention, only one copy of each different word is stored in the file.

In another embodiment of the present invention a first file representing a document is read in a first file format. The document contains a plurality of objects, and a set of objects in the plurality of objects are classified as similar. The first file in the first file format includes at most one copy of an object belonging to the set of objects in the plurality of objects. The first file in the first file format further includes a spatial layout index containing the location in the document of objects in the plurality of objects. The file in the first file format is converted into a second file in a second file format wherein the second file format has more than one copy of the object belonging to the set of objects.

In one aspect of the present invention, a plurality of sets of objects in the plurality of objects are generated wherein objects in the plurality of objects in each set in the plurality of sets are classified as similar and wherein the file in the first file format contains at most one copy of an object from each set in the plurality of sets. In another aspect of the invention, the second file in the second file format has more than one copy of objects from sets in the plurality of sets. In still another aspect of the present invention, the second file in the second file format does not have a spatial layout index. In another aspect of the present invention the second file in the second file format does not include sufficient information to reproduce the document without the use of a font library external to the second file in the second file format.

In still another embodiment of the present invention a first file represents a document. The first file in a first file format is stored in a memory. The document contains a plurality of objects, and a set of objects in the plurality of objects are classified as similar. The first file in the first file format includes at most one copy of an object belonging to the set of objects in the plurality of objects. The first file in the first file format further includes a spatial layout index containing the location in the document of objects in the plurality of objects. A resource converts the file in the first file format is into a second file in a second file format wherein the second file format has more than one copy of the object belonging to the set of objects. In one aspect of the invention the second file is stored in the memory.

In one aspect of the present invention, a plurality of sets of objects in the plurality of objects are generated wherein objects in the plurality of objects in each set in the plurality of sets are classified as similar and wherein the file in the first file format contains at most one copy of an object from each set in the plurality of sets. In another aspect of the invention, the second file in the second file format has more than one copy of objects from sets in the plurality of sets. In still another aspect of the present invention, the second file in the second file format does not have a spatial layout index. In another aspect of the present invention the second file in the second file format does not include sufficient information to reproduce the document without the use of a font library external to the second file in the second file format.

The file structure of the present invention provides an efficient and integrated approach to addressing major requirements of document management and solving many of the problems associated with traditional techniques. The file makes possible high speed full-text searching of documents, since the document structure is also intrinsically an 'indexed' structure as well due to the spatial layout index. In addition, each electronic document (i.e. file) carries its own index with it as it moves, eliminating the need to build separate document indexes.

In still another embodiment of the invention a file in a file format represents a document. The file in the file format is stored in a memory. The document contains a plurality of objects. A set of objects in the plurality of objects are classified as similar. The file in the file format includes at most one copy of an object belonging to the set of objects in the plurality of objects and the file in the file format further includes a spatial layout index containing the location in the document of objects in the plurality of objects.

The file retains the full content of the document, i.e. every word, including its page layout and formatting. Hence, the information content and the index structure are very tightly integrated, making possible new search capabilities not easily achieved by alternative solutions. The file can also be used to accurately reconstruct the scanned images of paper documents, providing true-to-the-original page fidelity.

In the file format in accord with an embodiment of the present invention, the information content of a document is stored in just one file, unlike traditional word processing files. In a traditional word processing file representing a document, libraries and resources external to the traditional file are required in order to be able to reproduce the document represented by the traditional file. For example, such traditional file formats may require a font library or a graphics library in order for the text or graphics of the document to be recreated.

Additionally, the file of the present invention eliminates redundancy of both the textual and graphical content of a document. This makes possible file compression ratios not easily achieved by alternative solutions. Thus, both storage and bandwidth requirements are minimized considerably as well.

SUMMARY OF FIGURES

FIG. 7 lists 100 common English words.

FIG. 8 lists some uncommon English words.

DETAILED DESCRIPTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the invention. Thus, the present invention is not intended to be limited to the embodiments disclosed, but is to be accorded the widest scope consistent with the principles and features disclosed herein.

Figure 1:
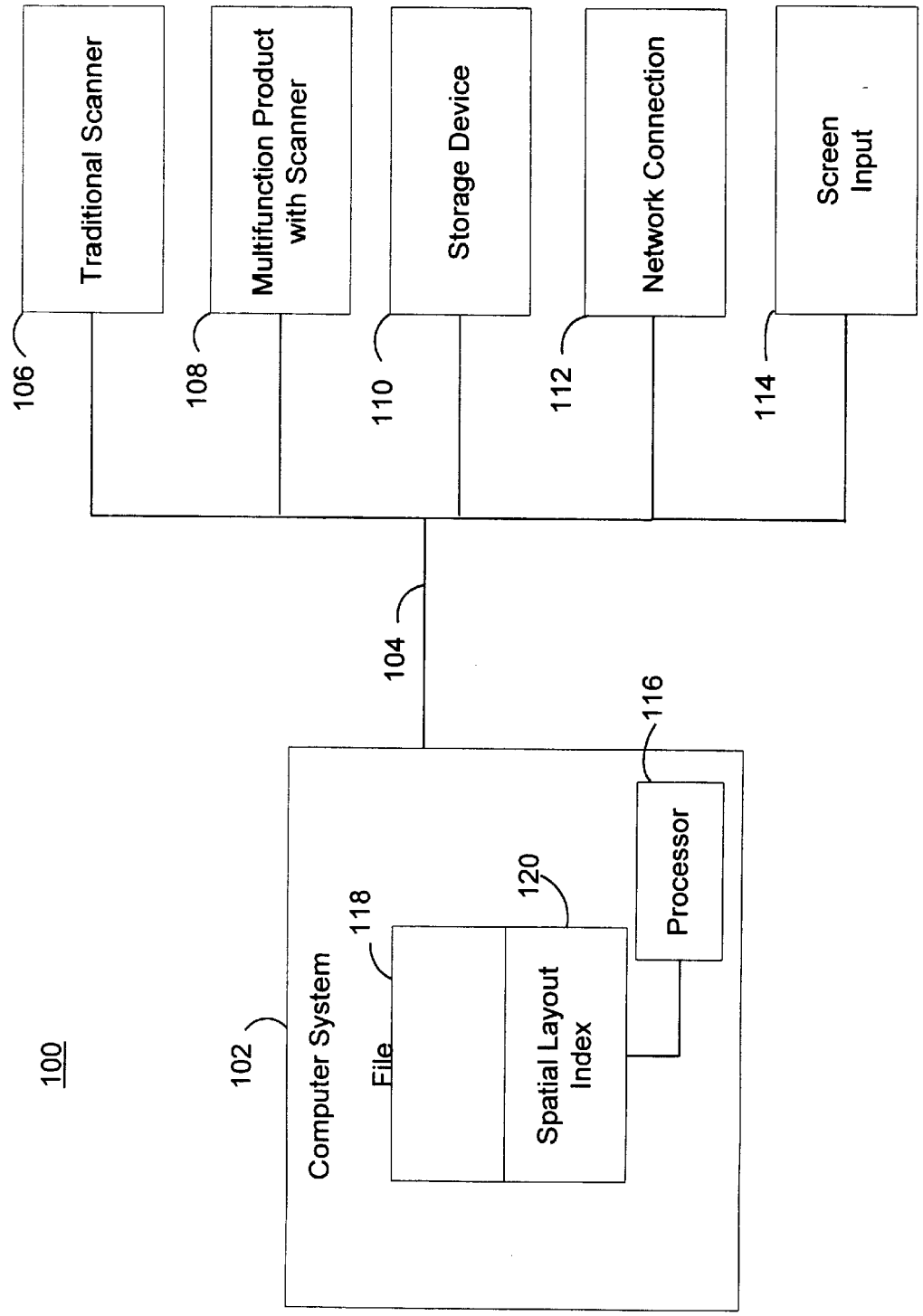
FIG. 1 is a diagram illustrating an embodiment of the present invention depicting various input devices.

FIG. 1 is a diagram illustrating file system 100. In this embodiment of the present invention, computer system 102 is connected through cable 104 to one or more input devices. Input devices may include but are not limited to traditional scanner 106, multifunction product scanner 108, storage device 110, network connection 112, screen input 114, or any other device which can input a representation of a document to computer system 102. Although not show in FIG. 1, the representation of the document can be in the form of a traditional word processing document stored in memory in computer system 102 or input through network connection 112.

Computer system 102 contains processor 116 which is any type of processor such as a microprocessor, dedicated logic, a digital signal processor, a programmable gate array, a neural network, or a central processor unit implemented in any other technology. Processor 116 identifies objects present in the representation of the document and stores one copy of each different object in file 118. Processor 116 also identifies the location of each object in the document and stores the location of each object in spatial layout index 120.

Figure 2:
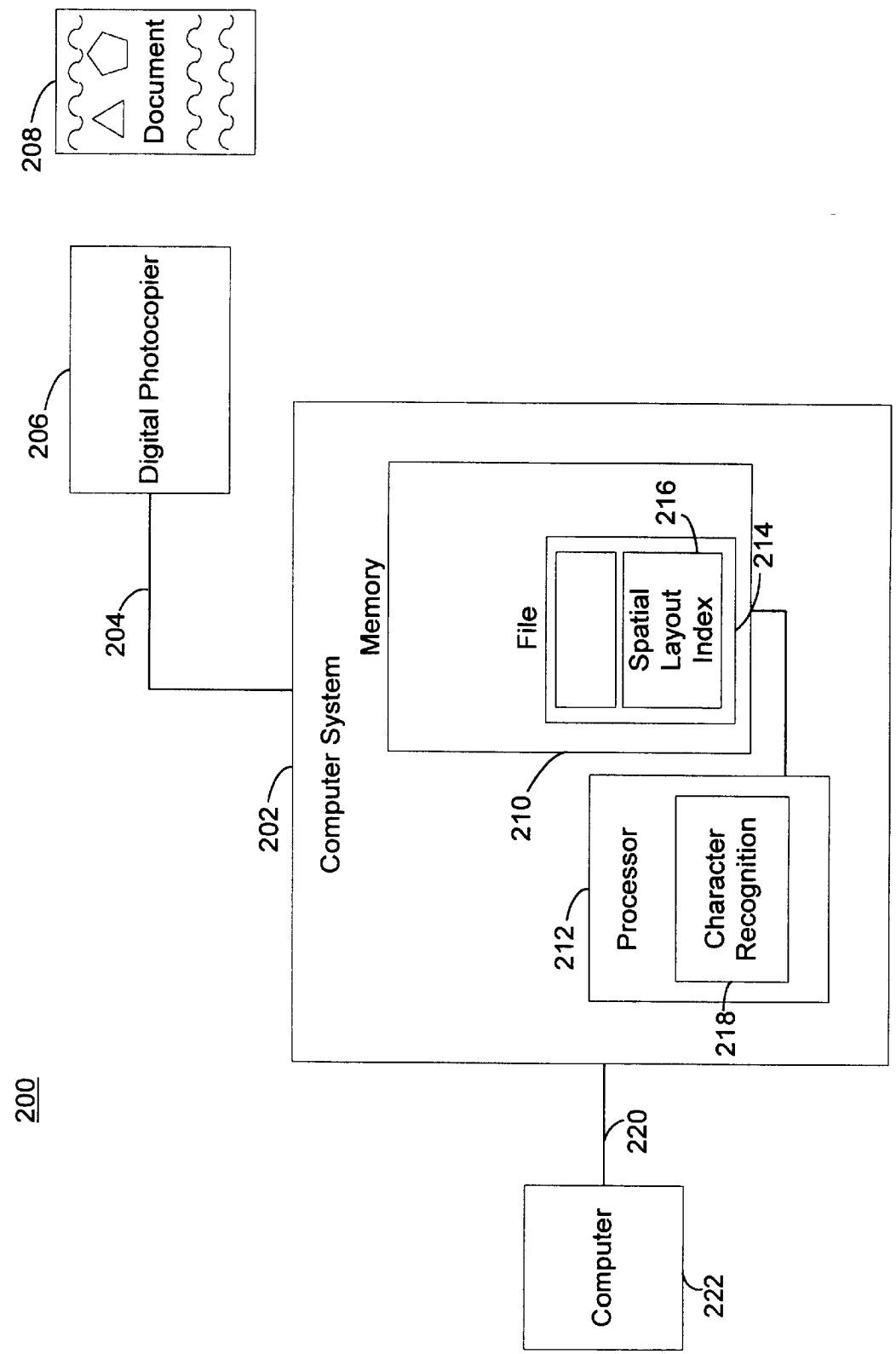
FIG. 2 illustrates another embodiment of a file system showing a network connection and a photocopier input.

Yet another embodiment for the present invention is shown in FIG. 2. FIG. 2 depicts networked file system 200. Networked file system 200 includes computer system 202 connected through cable 204 to digital photocopier system 206. Document 208 contains characters and graphics. Document 208 is fed into digital photocopier system 206 which converts document 208 into a representation containing objects. Objects in the plurality of objects in the representation correspond to characters and graphics present in the document. The representation is transferred to computer system 202 through cable 204.

The representation of the document 208 is stored in memory 210 in computer system 202. Then, as discussed in detail below, processor 212 in computer system 202 processes the representation. Objects present in the representation are identified by processor 212 and one copy of each different object is stored in file 214. Using the representation, processor 212 determines the location of each object in the document. The locations are stored in spatial layout index 216 in file 214, and the locations are associated with the appropriate object in file 214.

According to one aspect of the invention, processor 212 identifies characters present in objects in the plurality of objects using character recognition resource 218, and the spatial layout index stores the location or locations of each character. According to another aspect of the present invention, processor 212 identifies words present in the objects in the plurality of objects, and the spatial layout index stores the location of each word.

Computer system 202 is linked through external connection 220 to computer 222. External connection 220 can be any connection external to computer system 202, including but not limited to a wide area network, a local area network, or the Internet. File 214 can be transmitted over external connection 220 to computer 222. File 214 is then stored in computer 222 and it can then be used to created, process or retransmit document 208 as desired.

Figure 3:
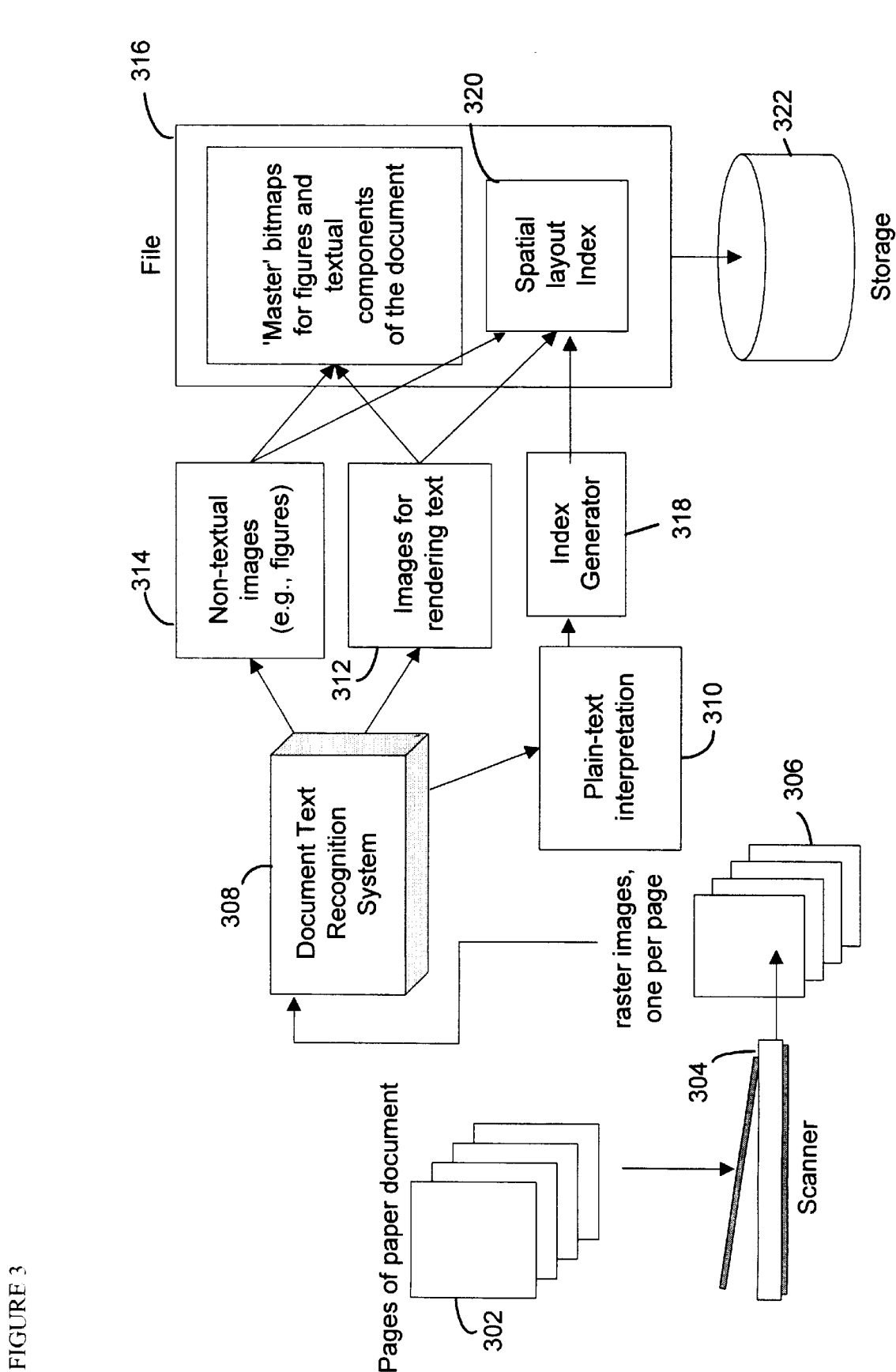
FIG. 3 graphically depicts the steps used in one embodiment of the invention to convert a paper document into a file in accord with an embodiment of the present invention.

FIG. 3 graphically depicts how one embodiment of the invention converts a paper document into a file in accord with the present invention for storage in a computer system. Paper document 302 is scanned using scanner 304 producing raster image or representation 306 of document 302. Representation 306 is input into document text recognition system 308. Plaintext interpretation 310, images for rendering text 312, and non-textual images 314 are output from document text recognition system 308.

Plaintext interpretation 310 contains character or words identified from representation 306 using document text recognition system 308. Images for rendering text 312 contains images (e.g., bit maps) of the characters in plaintext interpretation 310. Non-textual images 314 contains images (e.g., bitmaps) of non-text images such as graphics or Figures.

Non-textual images 314 and images for rendering text 312 are stored in file 316. Plaintext interpretation 310 is input into index generator 318. Location information from non-textual images 314, images for rendering text 312 and index generator 318 are stored in spatial layout index 320 in file 316. File 316 can then be stored in storage device 322. File 316 can be used to recreate, process or transmit document 302 as desired.

Figure 4:
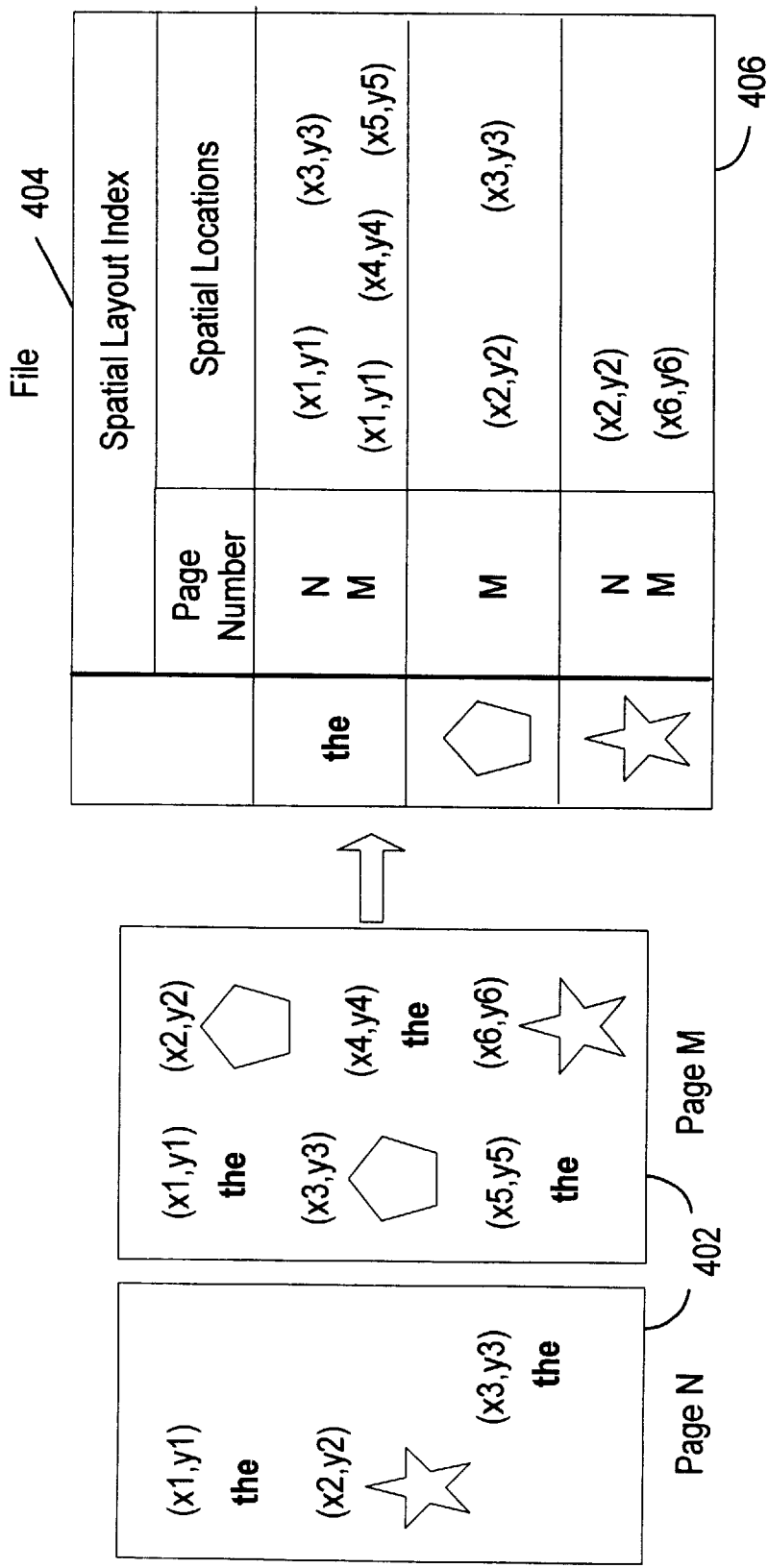
FIG. 4 depicts a two page document stored as a file in accord with an embodiment of the invention.

As discussed above, the spatial layout index of the present invention provides location information for each object in the file, whether the object is a character, graphic, or any type of bit mapped image. FIG. 4 illustrates two page document 402 converted into file 404 in accordance with an embodiment of the present invention. File 404 contains one copy of each different word or graphic present in document 402. Spatial layout index 406 contains the location of each word or graphic in document 402.

As depicted in this embodiment of the invention, the spatial layout index stores location information of objects in the file using page number and absolute coordinates of each object on the physical page. Any suitable location scheme can be used without departing from the present invention. For example, location information can be stored as relative coordinates of the objects with respect to each other or as distance of the objects from a calculated point or a user defined point such as the center of a page, or the centroid of the objects on the page.

Since the file tracks the coordinates of all words in the document using the spatial layout index and stores each object present in the document, the file represents both an index structure and a full-text document content structure as well. The file can be used to reconstruct, independently, any arbitrarily chosen sentence within a document, using only the relevant plaintext words and their spatial-layout information. This allows the file to support both high speed searching such as key word searching, as well as full text searching and analysis of scanned documents.

For example, using file 404 a search can be performed of document 402 for the word "the." The structure of file 404 allows not only each instance of the word "the" to be easily found, but also statistical information can be easily extracted. Such information includes, how many times the word appears in the document, and the frequency of occurrence of the word relative to other objects.

Figure 5:
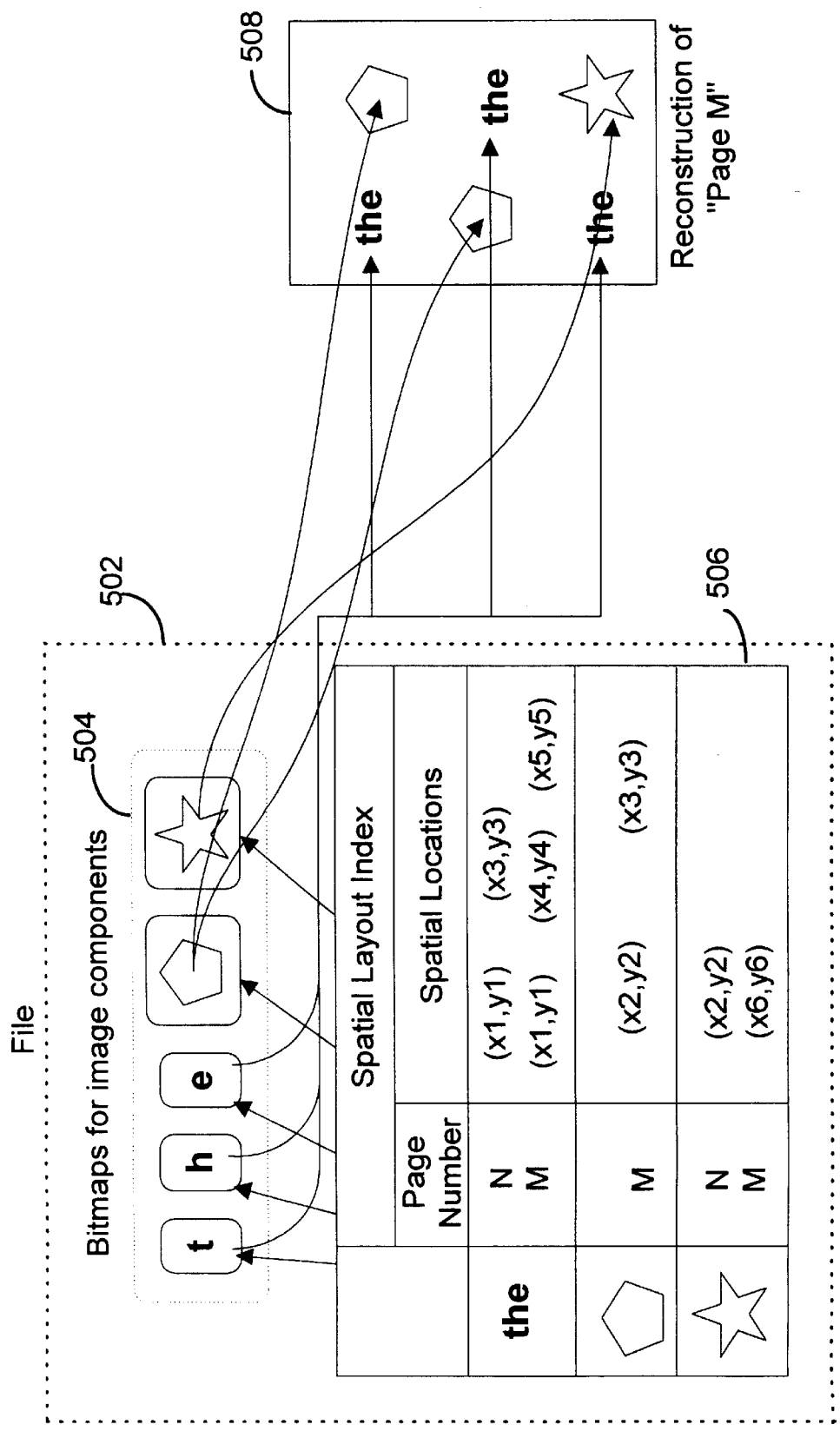
FIG. 5 depicts a file in accord with an embodiment of the present invention used to reconstruct a portion of a document.

According to yet another embodiment of the present invention, the file contains bit mapped images of each object in the document. This is illustrated in FIG. 5. File 502 contains bit mapped images 504 for each object. File 502 also contains spatial index list 506. Using file 502 page M 508 can be reconstructed using bit mapped images 504. This embodiment of the invention can be used to provide extremely high fidelity reproductions of the original scanned document layout and formatting.

According to an aspect of the invention, the use of bitmapped images to reconstruct a document helps to eliminate imperfections that can be introduced into a document through problems including imprecise font synthesis and incorrect character recognition. Many character recognition technologies synthesize fonts (for display and printing purposes) based on the recognition output, each letter incorrectly recognized will result in the displaying of an identically incorrect synthesized letter. In addition, if the font synthesis engine does not support the true font used in the scanned document, then it will synthesize the next closest font (in terms of appearance). These issues prevent true reproduction of scanned documents. For example, if the raster letter "h" in a scanned document that was typeset using the Times Roman font is incorrectly recognized as a "b", then the assumed raster "b" will be synthesized for display. If the synthesis engine does not support Times Roman, and substitutes the Helvetica font instead, then a further erosion of the scanned document's true formatting and page layout occurs.

As depicted in FIG. 5, one embodiment of the present invention can be used to eliminate the need for font synthesis. Instead of font synthesis, the present invention records the constituent bitmaps 504 for each unique textual element in the plaintext portion of the scanned document. It links these bitmaps to the objects indexed in the spatial layout index discussed above so that the objects in the file can be correctly placed in the reconstructed document.

The present invention can also be used to reconstruct specified portions of a document or specified objects in the document. As shown in FIG. 5, the file structure easily allows the reconstruction of page M alone. The file structure can also be used to reconstruct only portions of a particular page, or place only certain objects in the reconstruction.

Figure 6:
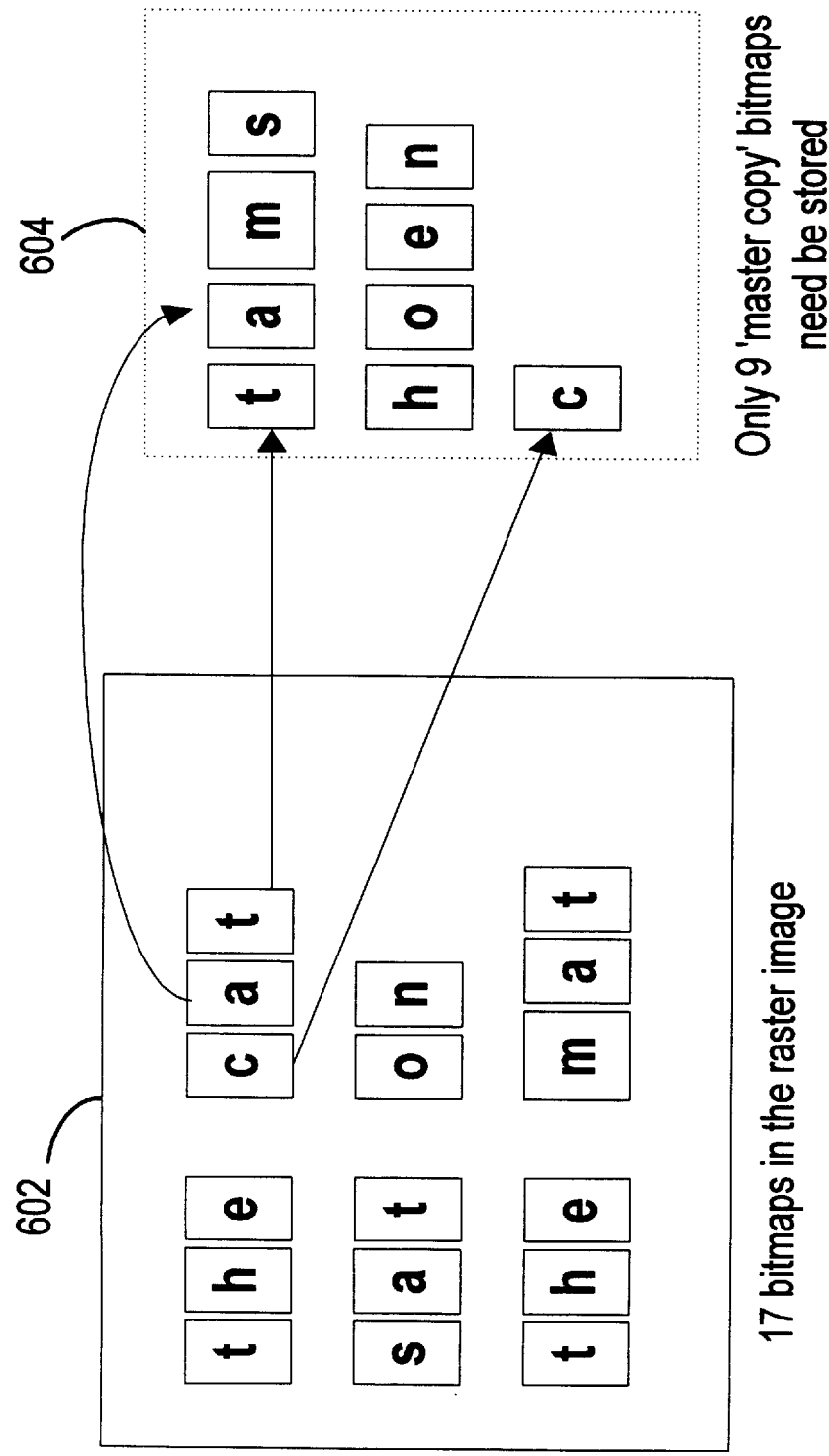
FIG. 6 illustrates the use of a file system in accord with an embodiment of the invention to compress a file.

Another embodiment of the present invention can be used to help achieve sizable compression of a document. FIG. 6 illustrates one type of data compression that is achievable using the present invention. The repeated patterns in raster image 602 are found and as discussed above, only one copy of each of the unique bitmaps needs to be stored in file 604. In the example of FIG. 6, the 17 bitmapped images can be stored as the 9 unique images, reducing the redundancy inherent in document 602. This reduces the storage space needed to store image 602. Reducing the redundancy of a document allows less data to be transmitted, or stored for a typical document with no reduction in the information content of the document.

According to another embodiment of the present invention, the inherent redundancy of the textual portion of a document is reduced when the document is converted into a file in accord with an embodiment of the present invention. In English 10 common words make up more than 25% of many documents. This may be true regardless of subjects of discussion, vocabulary, or ways of expression. These 10 common words are: the, of and, to, a, in, that, it, is, and I FIG. 7 shows a list of 100 of the most common words. These 100 words can comprise as much as 40% to 50% of some typical documents. Additionally, uncommon words, that is words which are not common words, may also appear one or more times in a typical document. Examples of uncommon English words are shown in FIG. 8.

The indexed structure of the file can be used to eliminate the redundancy inherent in documents due to common and uncommon words. Using the present invention, common or uncommon words appear only once in the file, and the location in the document of each common or uncommon word is stored the spatial location index. The spatial layout index can be used to recreate the full content layout of the document, and all redundant instances of any word have been compressed into a single entry in the file.

The file that results after eliminating this redundancy is extremely efficient, allowing reduced network bandwidth and storage capacity requirements. Shorter search and retrieval times may also result as well since, by design, the file is indexed automatically.

According to another aspect of the present invention the file that is generated from a document is a single file. Storing all of the information needed to recreate the document within one file reduces problems that can occur if images, text or location information are stored in separate files which can become inadvertently separated.

According to another aspect of the invention, the file can be designed with an extremely efficient data structure for indexing words on each page of a document, with common words given the lowest priority. This will increase tremendously the speed with which database searches can be accomplished. The words are ordered alphabetically, and according to word-length. Each word has, in one embodiment of the invention, pointers to every x-y location, and line, on each page where it occurs within the document. Each word may also be expressed in many different fonts depending on its x-y location. The main benefit to this ordering is that the database engine is only required to uncompress and search the very beginning of the file, and not the entire document, to know everything contained in that document.

The foregoing description of embodiments of the present invention are presented for the purposes of illustration and description only. They are not intended to be exhaustive or to limit the invention to the forms disclosed. Many modifications and variations will be apparent to practitioners skilled in the art. It is intended that the scope of the invention be defined by the following claims and their equivalents.

What is claimed is:

1. A method for producing a file structure for representing a scanned image of at least a portion of a physical document, comprising:

receiving a resolution dependent bitmap image of a physical document, said image being produced by an optical scanning device including a plurality of bitmapped features, said plurality of bitmapped features in said image having no initial plain text identities;

locating said plurality of bitmapped features in said image and inputting said plurality of bitmapped features into a text recognition system which obtains output plain text values for a subset of the bitmapped features in said plurality of bitmapped features, where said output plain text values may be single character codes or strings of character codes;

classifying as non-textual those bitmapped features in the plurality of bitmapped features that are not members of said subset for which plain text values were obtained, and as textual those bitmapped features which are members of said subset for which plain text values were obtained from said recognition system;

using said classifications to group textual bitmapped features into textual records, one textual record per textual bitmapped feature, and each textual record listing at least the following items: the output plain text value as provided by said textual recognition system, the spatial location of the bitmapped feature in said image, and a bitmap of the bitmapped feature;

thereby making the image searchable by enabling the comparison of plain text, as provided by a query search engine, to be compared with plain text values in said textual records, thereby locating any textual bitmaps in the image that match the query plain text;

grouping non-textual bitmapped features into non-textual records, each non-textual record listing at least the following items: the spatial location in the bitmapped feature in said image, and a bitmap of the bitmapped feature;

generating a file comprising said textual and non-textual records so as to represent the image and a plain text interpretation of any textual bitmaps therein.

2. The method of claim 1, including producing an indexed structure to the textual records, said index using the plain text values in said textual records as keys to locating said textual records.

3. The method of claim 1, in which said step of grouping textual bitmaps into textual records includes grouping multiple textual bitmaps into a single textual record if such textual bitmaps have been solved by said text recognition system for the same or similar plain text value, the textual record therefore listing at least the following items: the plain text value, the spatial locations in the image of all instances of textual bitmaps recognized for the plain text value, and bitmaps of the bitmapped features, the file structure thereby comprising a possibly reduced number of textual records for each unique plain text value recognized.

4. The method of claim 1, including prior to outputting said file:

comparing two or more said bitmaps, in one or more said textual and non-textual records in said generated file, for optically similar shape properties, and if sufficiently similar then any two or more said bitmaps are replaced by a single bitmap in said records.

5. The method of claim 3, including prior to outputting said file:

comparing two or more said bitmaps, in one or more said textual and non-textual records in said generated file, for optically similar shape properties, and if sufficiently similar then any two or more said bitmaps are replaced by a single bitmap in said records.

6. The method of claim 3, including producing an indexed structure to the textual records, said index using the plain text values in said textual records as keys to locating said textual records.

7. A file structure produced according to a method for producing said file structure for representing a scanned image of at least a portion of a physical document, comprising:

receiving a resolution dependent bitmap image of a physical document, said image being produced by an optical scanning device including a plurality of bitmapped features, said plurality of bitmapped features in said image having no initial plain text identities;

locating said plurality of bitmapped features in said image and inputting said plurality of bitmapped features into a text recognition system which obtains output plain text values for a subset of the bitmapped features in said plurality of bitmapped features, where said output plain text values may be single character codes or strings of character codes;

classifying as non-textual those bitmapped features in the plurality of bitmapped features that are not members of said subset for which plain text values were obtained, and as textual those bitmapped features which are members of said subset for which plain text values were obtained from said recognition system;

using said classifications to group textual bitmapped features into textual records, one textual record per textual bitmapped feature, and each textual record listing at least the following items: the output plain text value as provided by said textual recognition system, the spatial location of the bitmapped feature in said image, and a bitmap of the bitmapped feature;

thereby making the image searchable by enabling the comparison of plain text, as provided by a query search engine, to be compared with plain text values in said textual records, thereby locating any textual bitmaps in the image that match the query plain text;

grouping non-textual bitmapped features into non-textual records, each non-textual record listing at least the following items: the spatial location in the bitmapped feature in said image, and a bitmap of the bitmapped feature;

generating a file comprising said textual and non-textual records so as to represent the image and a plain text interpretation of any textual bitmaps therein.

8. The file structure of claim 7, said method of producing including producing an indexed structure to the textual records, said index using the plain text values in said textual records as keys to locating said textual records.

9. The file structure of claim 7, said method of producing in which said step of grouping textual bitmaps into textual records includes grouping multiple textual bitmaps into a single textual record if such textual bitmaps have been solved by said text recognition system for the same or similar plain text value, the textual record therefore listing at least the following items: the plain text value, the spatial locations in the image of all instances of textual bitmaps recognized for the plain text value, and bitmaps of the bitmapped features, the file structure thereby comprising a possibly reduced number of textual records for each unique plain text value recognized.

10. The file structure of claim 7, said method of producing including prior to outputting said file:

comparing two or more said bitmaps, in one or more said textual and non-textual records in said generated file, for optically similar shape properties, and if sufficiently similar then any two or more said bitmaps are replaced by a single bitmap in said records.

11. The file structure of claim 9, said method of producing including prior to outputting said file:

comparing two or more said bitmaps, in one or more said textual and non-textual records in said generated file, for optically similar shape properties, and if sufficiently similar then any two or more said bitmaps are replaced by a single bitmap in said records.

12. The file structure of claim 10, said method of producing including producing an indexed structure to the textual records, said index using the plain text values in said textual records as keys to locating said textual records.

\* \* \* \* \*